T863001

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 999

717,468

POLYOLEFIN COMPOSITIONS

Gordon Clay Newland and Gerald Ray Lappin, both of P.O. Box 511, Kingsport, Tenn. 37662, and John Ware Tamblyn, P.O. Box 92, Jonas Ridge, N.C. 28641

Continuation-in-part of application Ser. No. 323,139, Nov. 23, 1963. This application Mar. 29, 1968. Published June 24, 1969

Int. Cl. C08f *27/22, 45/00*

U.S. Cl. 260—94.9

No Drawing. 7 Pages Specification

Chelates such as nickel II/dodecyl benzoylacetate, nickel II/decyl acetoacetate, nickel II/ethyl benzoylacetate, nickel II/oleyl acetoacetate, manganese II/dodecyl acetoacetate, cobalt II/dodecyl acetoacetate, and zinc II/dodecyl acetoacetate promote the controlled oxidation of polymeric materials, particularly polyolefins containing from 1 to 8 carbon atoms, and make it possible to closely regulate the rate and degree of oxidation. The metal chelates are employed in catalytic amounts generally on the order of less than 5 percent and effectively catalyze the photooxidation and oxidation of the polymeric materials. The metal chelates provide catalytic versatility for the preparation of waxes and other applications such as agricultural mulching films. The polymeric materials include not only homopolymers but also copolymers obtained from the polymerization of at least two different polymers.